United States Patent [19]

Kambe et al.

[11] Patent Number: 4,877,663

[45] Date of Patent: Oct. 31, 1989

[54] ETHYLENIC THERMOPLASTIC RESIN COMPOSITION

[75] Inventors: Shigemitsu Kambe, Kawasaki; Hideaki Miyafuzi, Kisarazu, both of Japan

[73] Assignee: Nippon Petrochemicals Company, Limited, Tokyo, Japan

[21] Appl. No.: 241,084

[22] Filed: Sep. 6, 1988

[30] Foreign Application Priority Data

Sep. 11, 1987 [JP] Japan ................. 62-226462

[51] Int. Cl.$^4$ .......... C08J 5/18; C08L 23/08; C08L 23/18; C08L 33/04; 525 221; 525 222; 525 227; 428 35

[52] U.S. Cl. ............. 428/35.5; 525/221; 525/222; 525/227

[58] Field of Search .......... 525/221, 222, 227; 428/35

[56] References Cited

U.S. PATENT DOCUMENTS

| | | | |
|---|---|---|---|
| 4,451,536 | 5/1984 | Barlow et al. | 428/383 |
| 4,590,124 | 5/1986 | Schoenberg | 428/339 |
| 4,623,567 | 11/1986 | Hert | 428/36 |
| 4,732,940 | 3/1988 | Yamaoka et al. | 525/194 |

OTHER PUBLICATIONS

Plastics & Rubber International-VLDPE-4/86, vol. 11, No. 2, pp. 34.

*Primary Examiner*—Carman J. Seccuro
*Attorney, Agent, or Firm*—Dilworth & Barrese

[57] ABSTRACT

An ethylenic thermoplastic resin composition suitable for a heavy duty bag which comprises (a) 20–80% by weight of an ethylene/α-olefin copolymer having a density of 0.910 to 0.940 g/cm$^3$.

(b) 70–5% by weight of a copolymer of ethylene and a carboxyl group containing monomer or a derivative thereof; and (c) 50–5% by weight of an ethylene/α-olefin copolymer having (i) a density in the range of not lower than 0.860 g/cm$^3$ to lower than 0.910 g/cm$^3$, (ii) a maximum peak temperature not lower than 100° C. as measured according to differential scanning calorimetry (DSC) and (iii) a boiling n-hexane insolubles content not smaller than 10% by weight, provided the total amount of the components (a), (b) and (c) is 100% by weight.

5 Claims, 1 Drawing Sheet

ETHYLENIC THERMOPLASTIC RESIN COMPOSITION

BACKGROUND OF THE INVENTION

The present invention relates to an ethylenic thermoplastic resin composition and a heavy duty bag. More particularly, it is concerned with a thermoplastic resin composition formed by a combination of three kinds of ethylenic polymers, having superior low-temperature impact resistance and moderate rigidity, and suitable as film for a heavy duty bag, as well as a heavy duty bag obtained from the said composition.

As the material for industrial-use films, particularly films for heavy duty bags to contain fertilizers, industrial chemicals, sugar, salt and soil, there has heretofore been widely used an ethylene-vinyl acetate copolymer (EVA). Since a heavy duty bag containing a heavy material may be handled very roughly during the transport work, the film of the bag is first required to be superior in impact resistance, particularly, low-temperature impact resistance. Further, in order for the bag to stand by itself during the automated filling operations, the film is required to have stiffness, namely, moderate rigidity.

Recently, for resources saving, studies have been made to reduce the film thickness of heavy duty bags to 200 μ or less. To this end, the resins to be used are being desired to be more excellent in the above characteristics than before.

As an example of such resources saving type heavy duty bag film, mention may be made of a linear low-density polyethylene (LLDPE) film. However, LLDPE is not always desirable because its melt tension is low and so the bubble stability is impaired during inflation molding, leading to deterioration of the film forming property. To remedy this drawback, if LLDPE is blended with a low density polyethylene (LDPE) or EVA (see, for example, Japanese Patent Laid-Open No. 225235/86), there will not be obtained a sufficient low-temperature impact resistance. Further, if an ethylene/α-olefin copolymer rubber (e.g. EPR or EPDM) is added for the purpose of improving impact resistance, the film will be deteriorated in its rigidity and so this is not desirable, either.

In view of the points mentioned above, the present invention aims at providing a novel ethylenic thermoplastic resin composition suitable as film for a heavy duty bag, and a heavy duty bag obtained from the said composition.

SUMMARY OF THE INVENTION

Having made extensive studies along the above-mentioned object, the present inventors found that a thermoplastic resin composition well-balanced in low-temperature impact resistance, rigidity and fluidity could be obtained by blending an ethylene/α-olefin copolymer (LLDPE) having a density of 0.910 to 0.940 g/cm$^3$, an ethylene/carboxyl group containing monomer copolymer and a specific low-density ethylene/α-olefin copolymer. On the basis of this finding we reached the present invention.

More specifically, the present invention resides in an ethylenic thermoplastic resin composition and a heavy duty bag obtained using the said composition, which composition comprises (a) 20–80 wt. % of an ethylene/α-olefin copolymer having a density of 0.910 to 0.940 g/cm$^3$, (b) 70–5 wt. % of a copolymer of ethylene and a carboxyl group containing monomer or a derivative thereof and (c) 50–5 wt. % of an ethylene/α-olefin copolymer having (i) a density in the range of not lower than 0.860 g/cm$^3$ to lower than 0.910 g/cm$^3$, (ii) a maximum peak temperature not lower than 100° C. as measured according to differential scanning calorimetry (hereinafter referred to as "DSC") and (iii) a boiling n-hexane insolubles content not smaller than 10 wt. %.

DETAILED DESCRIPTION OF THE INVENTION

Figure 1:
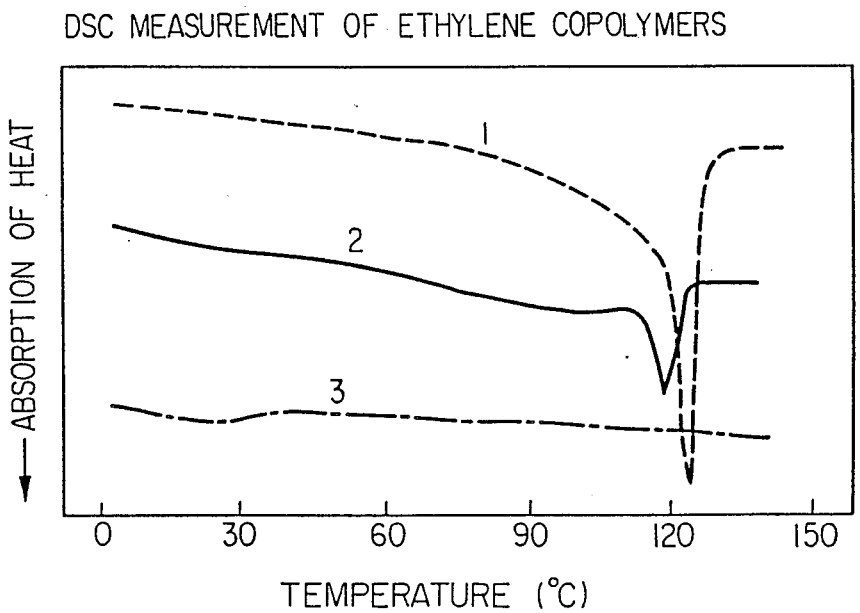
FIG. 1 shows the crystal melting behavior of a typical LLDPE, the ethylene/α-olefin copolymer used in the present invention and EPR according to DSC.

As the ethylene/α-olefin copolymer as component (a) in the present invention there is used one whose density is in the range of 0.910 to 0.940 g/cm$^3$, that is, one generally called a linear low-density polyethylene. If the density is lower than 0.910 g/cm$^3$, a film formed using the composition of the present invention will be of weak stiffness, that is, low in rigidity, while a density of the copolymer exceeding 0.940 g/cm$^3$ will result in poor impact resistance of the film.

The melt flow rate (hereinafter referred to as "MFR") of the ethylene/α-olefin copolymer as component (a) is selected from the range of 0.05 to 10 g/10 min, preferably 0.1 to 5 g/10 min, in consideration of the fluidity and strength of the composition.

Examples of the copolymer of ethylene and a carboxyl group containing monomer or a derivative thereof as component (b) in the present invention include copolymers of ethylene and unsaturated carboxylic acids or esters thereof such as, for example, ethylene-acrylic acid copolymer, ethylene-methacrylic acid copolymer, ethylene-ethyl acrylate copolymer, ethylene-ethyl methacrylate copolymer, and ethylene-maleic anhydride copolymer, as well as metallic salts thereof (e.g. ionomers). Ethylene-vinyl acetate copolymer can also be mentioned as an example. The content of the carboxyl group containing monomer or a derivative thereof is in the range of 3 to 50 wt. %, preferably 10 to 30 wt. %.

Particularly preferred are ethylene-ethyl acrylate copolymer, ionomers and ethylene-vinyl acetate copolymer.

The MFR of the copolymer of ethylene and a carboxyl group containing monomer or a derivative thereof as component (b) is selected from the range of 0.01 to 20 g/10 min, preferably 0.1 to 5 g/10 min, in consideration of fluidity and strength.

The ethylene/α-olefin copolymer used as component (c) in the present invention is a copolymer of ethylene and an α-olefin of C$_3$ to C$_{12}$, having such predetermined properties (i)–(iii) as mentioned above. As examples of the α-olefin are mentioned propylene, 1-butene, 4-methyl-1-pentene, 1-hexene, 1-octene, 1-decene and 1-dodecene. Particularly preferred are those having 3 to 6 carbon atoms, such as propylene, 1-butene, 4-methyl-1-pentene and 1-hexene. It is preferred that the α-olefin content of the ethylene/α-olefin copolymer be in the range of 5 to 40 mol %.

The following description is provided about how to prepare the ethylene/α-olefin copolymer [component (c)] used in the present invention.

The catalyst system used comprises a solid catalyst component and an organoaluminum compound, the solid catalyst component containing at least magnesium and titanium. The solid catalyst component is obtained, for example, by supporting a titanium compound on an inorganic solid compound containing magnesium by a known method. Examples of magnesium-containing inorganic solid compounds include, in addition to metallic magnesium, magnesium compounds such as magnesium hydroxide, magnesium carbonate, magnesium oxide and magnesium chloride, as well as double salts, double oxides, carbonates, chlorides and hydroxides, which contain magnesium and an element selected from silicon, aluminum and calcium. Further, these inorganic solid compounds after treatment or reaction with oxygen-containing compounds, sulfur-containing compounds, aromatic hydrocarbons or halogen-containing substances may be used.

As examples of the above oxygen-containing compounds are mentioned water, organic oxygen-containing compounds such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thio-ethers, and the like, inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrates the titanium compound, mention may be made of halides, alkoxy-halides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is an integer in the range $0 \leq n \leq 4$, such as, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium.

As examples of trivalent titanium compounds are mentioned titanium trihalides obtained by reducing titanium tetrahalides such as titanium tetrachloride and titanium tetrobromide with hydrogen, aluminum, titanium or an organometallic compound of a Group I-III metal in the Periodic Table, as well as trivalent titanium compounds obtained by reducing tetravalent alkoxytitanium halides of the general formula $Ti(OR_mX_{4-m}$ with an organometallic compound of a Group I-III metal in the Periodic Table in which formula R is an alkyl, aryl or aralkyl group having 1 to 20 carbon atoms, X is a halogen atom and m is an integer in the range $0 < m < 4$.

Among these titanium compounds tetravalent titanium compounds are particularly preferred.

As other examples of catalyst systems are mentioned combinations of organoaluminum compounds with reaction products as solid catalyst components obtained by the reaction of organomagnesium compounds such as so-called Grignard compounds with titanium compounds.

As still other examples of catalyst systems are mentioned combinations of organoaluminum compounds with solid products obtained by contacting such inorganic oxides as $SiO_2$ and $Al_2O_3$ with the solid catalyst component containing at least magnesium and titanium.

As preferred examples of the organoaluminum compound to be combined with the solid catalyst component are mentioned those represented by the general formulae $R_3Al$, $R_2AlX$, $RAlX_2$, $R_2AlOR$, $RAl(OR)X$ and $R_3Al_2X_3$ wherein Rs, which may be the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 mols per mol of the titanium compound.

The copolymerization reaction is carried out in the same manner as in the conventional olefin polymerization reaction using a Ziegler type catalyst. More particularly, the reaction is performed in a substantially oxygen-and water-free condition in vapor phase or in the presence of an inert solvent or using monomer per se as solvent. Olefin polymerizing conditions involve temperatures in the range of 20° to 300° C., preferably 40° to 200° C., and pressures in the range from normal pressure to 70 kg/cm²G, preferably 2 to 60 kg/cm²G. The molecular weight can be adjusted to some extent by changing polymerization conditions such as polymerization temperature and catalyst component mol ratio, but the addition of hydrogen into the polymerization system is more effective for this purpose. Of course, two or more multi-stage polymerization reactions involving different polymerization conditions such as different hydrogen concentrations and different polymerization temperatures can be carried out without any trouble.

It is necessary that the ethylene/α-olefin copolymer [component (c)] in the present invention thus produced exhibit the following properties:

(i) a density in the range of not lower than 0.860 g/cm³ to lower than 0.910 g/cm;
(ii) a maximum peak temperature (Tm) not lower than 100° C. as measured according to DSC; and
(iii) a boiling n-hexane insolubles ($C_6$ insolubles) content not smaller than 10 wt. %.

If the above density is 0.910 g/cm³ or more, there will not be made an improvement of impact strength, while if it is lower than 0.860 g/cm³, the mechanical strength of film formed using the composition of the invention may be deteriorated. Thus, both such values are not desirable.

A Tm value smaller than 100° C. will result in deteriorated tensile strength and heat resistance. Further, if the $C_6$ insolubles content is smaller than 10 wt. %, the proportion of an amorphous portion and that of low molecular components will be increased, thus resulting in deterioration in all of anti-blocking property, resistance to heat and oil, and strength.

The MFR of the ethylene/α-olefin copolymer as component (c) is selected in the range of 0.05 to 10 g/10 min, preferably 0.1 to 5 g/10 min.

The component (c) is a special ethylene/αolefin copolymer where both a highly crystalline portion and an amorphous portion are present and which has both such-mechanical strength and resistance to heat and oil as conventional crystalline polyolefins possess and such rubbery elasticity and flexibility as amorphous polymers possess. The present inventors found that by combining such component (c) with components (a) and (b) there could be easily obtained a composition having various properties required for a heavy duty bag film extremely well-balanced.

Conventional commercially available ethylene/α-olefin copolymers of this sort include the same linear low-density polyethylene (LLDPE) as component (a) and an ethylenepropylene copolymer rubber (EPR).

However, the ethylene/α-olefin copolymer used in the present invention is clearly distinguished from those conventional LLDPE and EPR. For example, reference is here made to FIG. 1 which shows crystal melting behavior of a typical LLDPE, the ethylene/α-olefin copolymer used in the present invention and EPR according to DSC. As can be seen from the result shown therein, the LLDPE has a fairly high crystallinity and is superior in heat resistance and mechanical strength as compared with the ethylene/α-olefin copolymer used in the present invention, but is inferior in flexibility and impact resistance.

On the other hand, the EPR, which is available commercially and is produced using vanadium as a principal component, exhibits little crystallinity. The proportion of a crystalline portion is extremely small and the Tm by DSC is far lower than 100° C. Although the EPR does not exhibit the aforesaid drawbacks of the LLDPE, namely, insufficient flexibility and impact resistance, it exhibits low values in point of heat resistance and mechanical strength.

The component (c) used in the present invention was measured for Tm and $C_6$ insolubles content in the following manner according to DSC.

[Measurement of Tm by DSC]

About 5 mg of a specimen was weighed from a hot-pressed 100 μm thick film and then set on a differential scanning calorimeter. The temperature was raised to 170° C. and the specimen was held at this temperature for 15 minutes, thereafter cooled to 0° C. at a rate of 2.5° C./min. Then, measurements were made with raising the temperature from this state to 170° C. at a rate of 10° C./min. The temperature at the vertex position of the maximum peak of peaks which appeared during the heat-up period from 0° C. to 170° C. was regarded as Tm.

[How to determine $C_6$ insolubles content]

A 200 μm thick sheet was formed using a hot press, from which were then cut out three 20 mm × 30 mm sheets. Using these sheets, extraction was made in boiling n-hexane for 5 hours by means of a double tube type Soxhlet extractor. n-Hexane insolubles were taken out and vacuum-dried (50° C., 7 hours), then the content of $C_6$ insolubles was calculated in accordance with the following equation:

$C_6$ insolubles content (wt. %) =

$$\frac{\text{Sheet weight after extraction}}{\text{Sheet weight before extraction}} \times 100$$

As to the proportions of the components in the ethylenic thermoplastic resin composition of the present invention, the (a)/(b)/(c) weight ratio is 20-80/70-5/-50-5, preferably 30-70/40-10/40-10, assuming that the total of components (a), (b) and (c) is 100 wt. %.

If the amount of component (a) exceeds 80 wt. %, the impact resistance of film formed using the composition of the invention will be deteriorated, while if it is smaller than 20 wt. %, insufficient rigidity and weak stiffness of the film will result. Thus, both such values are undesirable. If the amount of component (b) exceeds 70 wt. %, the film stiffness will become weak while if it is smaller than 5 wt. %, the melt tension during forming will become smaller, resulting in deterioration of the film forming property, and thus both such values are undesirable. Also when the amount of component (c) exceeds 50 wt. %, the film stiffness will become weak, while a smaller amount thereof than 5 wt. % will result in deteriorated impact resistance of film, and thus both such values are undesirable.

The ethylenic thermoplastic resin composition of the present invention can be prepared by blending the components (a), (b) and (c) homogeneously. The blending may be effected using any conventional technique. According to a typical example, the blending is performed by a dry blend method or a melt mixing method, using a conventional kneading machine such as a Henschel mixer, an extruder, or a tumbler.

Where required, fillers such as carbon black, calcium carbonate, silica metallic fiber and carbon fiber, or additives such as an anti-oxidant, a flame retardant and a coloring agent, may be added at the time of melt kneading. Further, various resins and rubbers such as crystalline polyolefins, e.g. high and low density polyethylenes, linear low-density polyethylene and polypropylene, as well as natural rubber, various synthetic rubbers and styrene type thermoplastic elastomers, may be added if necessary within the range not changing the performance of the thermoplastic resin composition of the present invention.

The heavy duty bag of the present invention can be obtained by forming the thus-prepared ethylenic thermoplastic resin composition into film by a conventional known forming method, for example, an inflation method involving melt extrusion of resin through an extruder followed by air- or water-cooling, or a flat die method using a cooling roll. Some inflation method employs an internal mandrel. Generally, the flat die method using a cooling roll is characterized in that since the molten resin cooling speed is high, the resulting film is superior in optical properties and the rate of production is also high. However, since heavy duty bags are used for containing heavy materials, it is not desirable in point of mechanical strength to form a flat film into a cylindrical shape by sealing side portions thereof. It is therefore better to use film obtained by an inflation method and form it into a heavy duty bag. Usually, a cylindrical film obtained by an inflation method is heat-sealed in the transverse direction to form a bag bottom portion, thereby obtaining a heavy duty bag.

Film which has been formed using the ethylenic thermoplastic resin composition of the present invention not only has a moderate stiffness but also is greatly improved in impact resistance, particularly superior in low-temperature impact resistance. Thus, by using the resin composition of the present invention it has now become possible to reduce the film thickness in the production of a heavy duty bag and thereby attain resources saving.

[WORKING EXAMPLES AND COMPARATIVE EXAMPLES]

The present invention will be described below concretely on the basis of working examples and comparative examples, but the invention is not limited thereto. The values of properties in the working and comparative examples have been measured by the following methods.

(MFR and Density)

Measured according to JIS K 6760.

(Tensile Modulus)

Measured under the following conditions according to JIS K 7113, as a measure of film rigidity (stiffness):

| Specimen (rectangular) | |
| --- | --- |
| Width | 20 mm |
| Distance between grips | 250 mm |
| Speed of testing | 25 mm/min |

Measurement was made with respect to both MD (machine direction) and CD (cross direction) of film and values not smaller than 1,500 kgf/cm$^2$ obtained were regarded as being acceptable.

(Film Impact Strength)

Measured using a dart impact tester according to ASTM D 1709 (method A). Values not smaller than 700 g obtained were regarded as being acceptable.

(Bag Drop Test)

Each heavy duty bag was filled with 20 kg of fertilizer, then sealed at the top and dropped onto the floor five times with one side facing downward, and the same was applied to the bag except with the other side facing downward, from the height of 1.2 m in a low-temperature room held at −10° C., and a check was made as to whether the bag has burst or not. The test was made for twenty heavy duty bags to report non-burst percentage (%).

EXAMPLES 1-5 AND COMPARATIVE EXAMPLES 1-5

(Preparation of Ethylenic Thermoplastic Resin Compositions)

The following polymers were used as components (a), (b) and (c).

Component (a):

(A) Linear low-density polyethylene (1) (density 0.920 g/cm$^3$, MFR 0.8 g/10 min, trade name: Nisseki LINIREX AF 1210, a product of Nippon Petrochemicals Co., Ltd.)

Component (b):

(D) Ethylene-ethyl acrylate copolymer (1) (ethyl acrylate content 10 wt. %, MFR 0.4 g/10 min, trade name: Nisseki REXLON EEA A 1100, a product of Nippon Petrochemicals Co., Ltd.)

Component (c):

The following copolymer was prepared by polymerizing ethylene and 1-butene using a catalyst consisting of a solid catalyst component and triethylaluminum which solid catalyst component had been obtained using substantially anhydrous magnesium chloride, 1,2-dichloroethane and titanium tetrachloride.

(G) Ethylene/1-butene copolymer (1)
(1-butene content 10 mol %, density 0.900 g/cm$^3$, MFR 0.3 g/10 min, Tm 120° C., C$_6$ insolubles content 80 wt. %)

The above components (a), (b) and (c) were dry-blended in predetermined weight rations to obtain ethylenic thermoplastic resin compositions. The proportions of the components are as shown in Table 1.

(How to produce Film and Heavy Duty Bag)

Production of Film

Using the above dry-blended, ethylenic thermoplastic resin compositions, tubular films for a heavy duty bag were produced by means of the following apparatus and under the following conditions:

| 70 mm dia. extruder | (die dia. 200 mm, lip spacing 2.2 mm) |
| --- | --- |
| Forming speed | about 14 m/min |
| Film thickness | 150 μm |
| Lay-flat width | 450 mm |

Production of Heavy Duty Bag

The above tubular films were each cut into the length of 700 mm and heat-sealed (bar sealer temperature: 170–200° C. at one end to form heavy duty bags.

The films and heavy duty bags thus obtained were evaluated for properties, the results of which are as shown in Table 1.

EXAMPLES 6–14

Ethylene thermoplastic resin compositions were prepared in the same way as above except that the following polymers were also used as components (a), (b) and (c) other than the above polymers (A), (D) and (G). Further, films and heavy duty bags were formed using those compositions and then tested, the results of which are as shown in Table 1.

Component (a):

(B) Linear Low-density polyethylene (2) (density 0.935 g/cm$^3$, MFR 2.0 g/10 min, trade name: Nisseki LINIREX AF 3710, a product of Nippon Petrochemicals Co., Ltd.)

Component (b):

(E) Ethylene-ethyl acrylate copolymer (2) (ethyl acrylate content 15 wt. %, MFR 1.5 g/10 min, trade name: Nisseki REXLON EEA A 2150, a product of Nippon Petrochemicals Co., Ltd.)

(F) Ethylene-vinyl acetate copolymer
(vinyl acetate content 7 wt. % MFR 0.3 g/10 min)

Component (c):

Ethylene and propylene were reacted using the same method as in the foregoing (G) to prepare the following copolymer:

(H) Ethylene-propylene copolymer (1) (propylene content 24 mol %, density 0.880 g/cm$^3$, MFR 0.9 g/10 min, Tm 119° C., C$_6$ insolubles content 45wt. %)

Further, the following copolymers were prepared by conducting polymerization of ethylene and propylene and that of ethylene and 1-butene, using a catalyst consisting of a solid catalyst component and triethylaluminum which solid catalyst component had been prepared using substantially anhydrous magnesium chloride, anthracene and titanium tetrachloride.

(I) Ethylene-propylene copolymer (2) (propylene content 19 mol %, density 0.890 g/cm$^3$, MFR 1.0 g/10 min, Tm 122° C., C$_6$ insolubles content 58 wt. %)

(J) Ethylene/1-butene copolymer (2) (1-butene content 8 mol %, density 0.905 g/cm$^3$, MFR 1.0 g/10 min, Tm 121° C., C$_6$ insolubles content 90 wt. %)

COMPARATIVE EXAMPLE 6

A resin composition, film and a heavy duty bag were produced in just the same way as in Example 13 except that the following polymer was used as component (a), and then tested, the results of which are as set out in Table 1.

Component (a);

(C) High density polyethylene (density 0.950 g/cm$^3$, MFR 0.6 g/10 min, trade name: Nisseki STAFLENE E 807(F), a product of Nippon Petrochemicals Co., Ltd.)

COMPARATIVE EXAMPLE 7

A resin composition, film and a heavy duty bag were produced in the same manner as in Examples 1-5 except that the following copolymer rubber was used as component (c), and then tested, the results of which are as set forth in Table 1.

Component (c):

(K) Ethylene-propylene copolymer rubber

An ethylene-propylene copolymer rubber was prepared using a vanadyl trichloride-ethylaluminum sesquichloride catalyst. The copolymer rubber had a propylene content of 30 mol %, a Mooney viscosity (ML$_{1+4'}$ 100° C.) of 73 and a density of 0.862 g/cm$^3$. There was recognized no peak in DSC, nor were recognized any C$_6$ insolubles.

As is apparent from Table 1, the films and heavy duty bags of Examples 1-13 wherein the components (a), (b), (c) and their proportions are within the scope of the present invention, are all superior in impact resistance and rigidity, while those obtained in Comparative Examples 1-7, which are outside the scope of the present invention, are inferior in at least either impact resistance or rigidity.

TABLE 1

| | | Composition | | | | | | Composition AMR (g/10 min) | Properties Film | | Heavy Duty Bag |
|---|---|---|---|---|---|---|---|---|---|---|---|
| | | Component (a) | | Component (b) | | Component (c) | | | Tensile Modulus [MD/CD] (kgf/cm$^2$) | Dart Impact Strength (g) | Bag Drop Test Acceptance (%) |
| Example | Item | Kind | Amount (wt. %) | Kind | Amount (wt. %) | Kind | Amount (wt. %) | | | | |
| Ex. | 1 | A | 30 | D | 40 | G | 30 | 0.4 | 1650/1800 | 900 | 100 |
| Ex. | 2 | A | 30 | D | 60 | G | 10 | 0.4 | 1900/2000 | 750 | 100 |
| Ex. | 3 | A | 50 | D | 20 | G | 30 | 0.4 | 1800/1950 | 800 | 100 |
| Ex. | 4 | A | 50 | D | 30 | G | 20 | 0.4 | 1900/2000 | 750 | 100 |
| Ex. | 5 | A | 60 | D | 30 | G | 10 | 0.5 | 2000/2100 | 700 | 100 |
| Comp. Ex. | 1 | A | 10 | D | 80 | G | 10 | 0.4 | 1350/1500 | 700 | 100 |
| Comp. Ex. | 2 | A | 25 | D | 20 | G | 55 | 0.4 | 1100/1300 | 1000 | 100 |
| Comp. Ex. | 3 | A | 66 | D | 3 | G | 30 | | Poor forming | | |
| Comp. Ex. | 4 | A | 66 | D | 30 | G | 3 | 0.5 | 2100/2200 | 700 | 80 |
| Comp. Ex. | 5 | A | 90 | D | 5 | G | 5 | 0.6 | 2200/2300 | 500 | 60 |
| Ex. | 6 | A | 50 | D | 20 | H | 30 | 0.6 | 1650/1700 | 800 | 100 |
| Ex. | 7 | A | 50 | D | 30 | H | 20 | 0.6 | 1700/1800 | 750 | 100 |
| Ex. | 8 | A | 50 | D | 20 | I | 30 | 0.6 | 1700/1850 | 750 | 100 |
| Ex. | 9 | A | 50 | D | 20 | J | 30 | 0.6 | 2000/2100 | 700 | 100 |
| Ex. | 10 | A | 50 | E | 20 | G | 30 | 0.5 | 1750/1800 | 850 | 100 |
| Ex. | 11 | A | 50 | F | 20 | G | 30 | 0.4 | 1800/1950 | 750 | 100 |
| Ex. | 12 | A | 50 | F | 20 | H | 30 | 0.6 | 1650/1750 | 750 | 100 |
| Ex. | 13 | B | 40 | D | 30 | G | 30 | 0.8 | 2300/2450 | 700 | 100 |
| Ex. | 14 | B | 40 | F | 20 | G | 40 | 0.4 | 1700/1800 | 850 | 100 |
| Comp. Ex. | 6 | C | 40 | D | 30 | G | 30 | 0.4 | 2500/2650 | 400 | 20 |
| Comp. Ex. | 7 | A | 55 | D | 25 | K | 20 | 0.5 | 1050/1150 | 700 | 100 |

What is claimed is:

1. A single-layer film formed from an uncrosslinked ethylenic thermoplastic resin composition comprising:
   (a) 20-80% by weight of an ethylene/α-olefin copolymer having a density of 0.910 to 0.940 g/cm$^3$.
   (b) 70-5% by weight of a copolymer of ethylene and a carboxyl group containing monomer or a derivative thereof; and
   (c) 50-5% by weight of an ethylene/α-olefin copolymer having
      (i) a density in the range of not lower than 0.860 g/cm$^3$ to lower than 0.910 g/cm$^3$,
      (ii) a maximum peak temperature not lower than 100° C. as measured according to differential scanning calorimetry (DSC) and
      (iii) a boiling n-hexane insolubles content not smaller than 10% by weight,
   provided the total amount of the components (a), (b) and (c) is 100% by weight.

2. The single-layer film as set forth in claim 1, wherein said copolymer (b) of ethylene and a carboxyl group containing monomer or a derivative thereof is an ethylene-ethyl acrylate copolymer or an ethylene-vinyl acetate copolymer.

3. The single-layer film as set forth in claim 1, wherein said ethylene/α-olefin copolymer is a copolymer prepared by polymerizing ethylene and an α-olefin having 3 to 12 carbon atoms in the presence of a catalyst comprising a solid component and an organoaluminum compound, said solid component containing at least magnesium and titanium.

4. The single-layer film as set forth in claim 1, wherein the content of the carboxyl group containing monomer or the derivative thereof in said copolymer (b) is in the range of 3% to 50% by weight.

5. A heavy duty bag formed from a single-layer film of the uncrosslinked ethylenic thermoplastic resin composition of claim 1.

* * * * *